(12) United States Patent
Matsuoka et al.

(10) Patent No.: US 7,512,483 B2
(45) Date of Patent: Mar. 31, 2009

(54) NAVIGATION SYSTEM

(75) Inventors: Yoji Matsuoka, Zama (JP); Teruyuki Ishida, Zama (JP); Keisuke Mutou, Zama (JP); Hiroaki Konda, Zama (JP); Takashi Yoshimaru, Kokubunji (JP); Takaaki Ishii, Kokubunji (JP); Mami Nomura, Kokubunji (JP); Tsugumichi Owaki, Kokubunji (JP)

(73) Assignee: Xanavi Informatics Corporation, Zama-shi (JP)

( * ) Notice: Subject to any disclaimer, the term of this patent is extended or adjusted under 35 U.S.C. 154(b) by 514 days.

(21) Appl. No.: 11/410,851

(22) Filed: Apr. 26, 2006

(65) Prior Publication Data

US 2006/0276959 A1  Dec. 7, 2006

(30) Foreign Application Priority Data

Apr. 26, 2005  (JP)  ............................. 2005-128097

(51) Int. Cl.
*G01C 21/00*  (2006.01)

(52) U.S. Cl. ................. 701/200; 701/201; 701/208; 701/211; 701/212; 340/995.1; 340/995.2; 340/995.27; 340/995.18

(58) Field of Classification Search ................. 701/200, 701/201, 208, 211, 212; 340/995.1, 995.2, 340/995.27, 995.18
See application file for complete search history.

(56) References Cited

U.S. PATENT DOCUMENTS 5,189,430 A * 2/1993 Yano et al. ................... 342/457
5,793,310 A * 8/1998 Watanabe et al. ...... 340/995.14

FOREIGN PATENT DOCUMENTS

JP  2000-111354 A  4/2000

* cited by examiner

*Primary Examiner*—Gertrude Arthur Jeanglaud
(74) *Attorney, Agent, or Firm*—Crowell & Moring LLP (57) ABSTRACT

According to the 1st aspect of the invention, a navigation system comprises: a storage unit that stores map data managed with links representing smallest road units; a road map display unit that displays a road map based upon the map data; a depressed position detection unit that detects a depressed position on the road map on display; and a route setting unit that extracts a corresponding link corresponding to the depressed position and sets the extracted corresponding link as a route to a destination based upon the map data, and the route setting unit extracts a link adjacent to the corresponding link and makes a decision as to whether or not the adjacent link can be entered from the corresponding link based upon the map data.

14 Claims, 11 Drawing Sheets

FIG. 11

NAVIGATION SYSTEM

INCORPORATION BY REFERENCE

The disclosure of the following priority application is herein incorporated by reference:
Japanese Patent Application No. 2005-128097 filed Apr. 26, 2005

FIELD OF THE INVENTION

The present invention relates to a navigation system that allows a route to a destination to be set with a finger tracing a road on-display.

DESCRIPTION OF RELATED ART

There is a navigation system known in the related art that allows the user to set a road on which he wishes to travel by tracing the road on display at the display screen with his finger or a touch pen while setting a route to the destination (see Japanese Laid Open Patent Publication No. 2000-111354).

SUMMARY OF THE INVENTION

The navigation system disclosed in Japanese Laid Open Patent Publication No. 2000-111354 allows the user to set any road on which he wishes to travel by tracing the road on the screen with his finger and thus, a problem arises that a road which the vehicle cannot travel due to traffic control, e.g., a one-way street, may be set as part of the route.

According to the 1st aspect of the invention, a navigation system comprises: a storage unit that stores map data managed with links representing smallest road units; a road map display unit that displays a road map based upon the map data; a depressed position detection unit that detects a depressed position on the road map on display; and a route setting unit that extracts a corresponding link corresponding to the depressed position and sets the extracted corresponding link as a route to a destination based upon the map data, and the route setting unit, extracts a link adjacent to the corresponding link and makes a decision as to whether or not the adjacent link can be entered from the corresponding link based upon the map data.

According to the 2nd aspect of the invention, in the navigation system according to the 1st aspect, it is preferred that if the adjacent link can be entered from the corresponding link and a subsequent depressed position corresponds to the adjacent link, the route setting unit sets the adjacent link as the route to the destination, and if the adjacent link cannot be entered from the corresponding link due to traffic control, the route setting unit does not set the adjacent link as the route to the destination even when the subsequent depressed position corresponds to the adjacent link.

According to the 3rd aspect of the invention, in the navigation system according to the 1st or the 2nd aspect, it is preferred that the road map display unit displays a road corresponding to the adjacent link in a display mode different from a display mode of other roads if the route setting unit judges that the adjacent link cannot be entered from the corresponding link due to traffic control.

According to the 4th aspect of the invention, in the navigation system according to the 1st or the 2nd aspect, it is preferred that the road map display unit does not display a road corresponding to the adjacent link if the route setting unit judges that the adjacent link cannot be entered from the corresponding link due to traffic control.

According to the 5th aspect of the invention, in the navigation system according to any of the 1st through 4th aspects, it is preferred that if three or more links are detected to be connected to one point in the route having been set, the route setting unit judges that a route error has occurred and issues a route error alert.

According to the 6th aspect of the invention, in the navigation system according to any of the 1st through 4th aspects, it is preferred that if three or more links are detected to be connected to one point in the route having been set, the route setting unit judges that a route error has occurred, extracts a link manifesting the route error among the three or more links and indicates the extracted link as a route error link.

According to the 7th aspect of the invention, in the navigation system according to the 5th or the 6th aspect, it is preferred that the route setting unit outputs a message asking whether or not to correct the route error and corrects the route having been set if a response indicating that the route error needs to be corrected is entered.

According to the 8th aspect of the invention, in the navigation system according to the 5th or the 6th aspect, it is preferred that the route setting unit brings up a display that allows the link corresponding to the route error to be removed from the route having been set and removes the link corresponding to the route error from the route having been set in response to a cancel instruction.

DESCRIPTION OF PREFERRED EMBODIMENT

Figure 1:
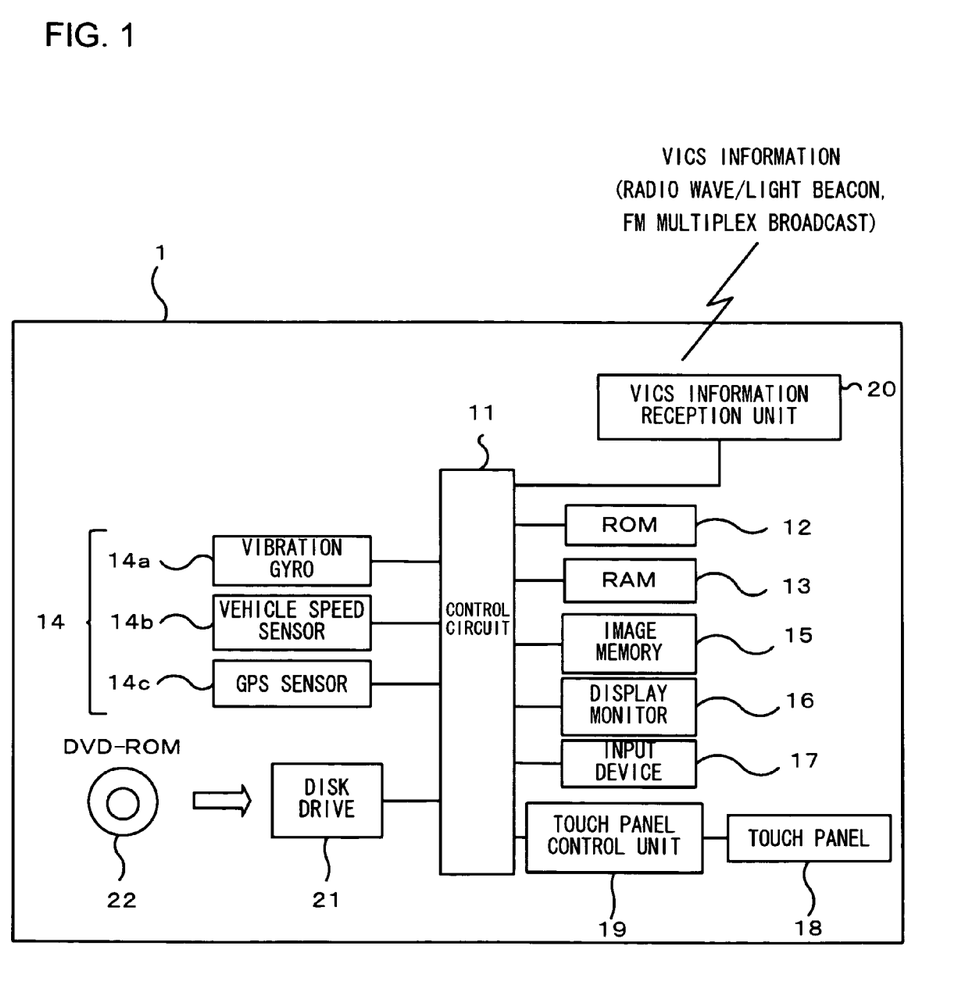
FIG. 1 is a block diagram showing the structure adopted in the navigation system achieved in an embodiment of the present invention.

FIG. 1 shows the structure adopted in the navigation system achieved in an embodiment of the present invention. The navigation system 1 in FIG. 1, which is installed in a vehicle, allows a route to a destination to be set by tracing the route on a touch panel 18. The navigation system 1 includes a control circuit 11, a ROM 12, a RAM 13, a current position detection device 14, an image memory 15, a display monitor 16, an input device 17, the touch panel 18, a VICS (road traffic information system) information reception unit 20 and a disk drive 21.

The touch panel 18 is a transparent touch switch laminated over the surface of the display monitor 16. An image displayed at the display monitor 16 is viewed through the touch panel 18. A signal corresponding to an operating position on the touch panel 18 is output from the touch panel 18 to a touch panel control unit 19, which then calculates the depressed position on the touch panel 18. A DVD-ROM 22 having recorded therein map data to be used to display a map at the display monitor 16 is loaded into the disk drive 21.

The map data include map display data and route search data. The route search data contain link information and node information with regard to the roads in the map data. In the embodiment, the map data are managed based upon a concept that a road is constituted with links and nodes. The term "node" is used to refer to an intersection or another type of specified point on a road. A link is equivalent to a portion of a road connecting two nodes. As the map display data, map data at a plurality of scaling factors, from wide-area to highly detailed, are provided, and the scaling factor of the map on display can be switched in response to a request from the user.

The control circuit 11, constituted with a microprocessor and its peripheral circuits, executes various types of control as it executes a control program stored in the ROM 12 by using the RAM 13 as a work area. The results of a specific type of route search processing executed by the control circuit 11 based upon the map data stored in the DVD-ROM 22 are displayed as a recommended route at the display monitor 16.

The current position detection device 14, which detects the current position of the vehicle, may be constituted with a vibration gyro 14a that detects the advancing direction of the vehicle, a vehicle speed sensor 14b that detects the vehicle speed, a GPS sensor 14c that detects a GPS signal transmitted from a GPS (global positioning system) satellite. Based upon the current position of the vehicle detected by the current position detection device 14, the navigation system 1 determines the map display range, the route search start point and the like and also indicates the current position on the map.

In the image memory 15, image data to be displayed at the display monitor 16 are stored. These image data, which include road map drawing data and various types of graphic data, are generated as necessary based upon the map data stored in the DVD, ROM 22 and read by the disk drive 21. The navigation system 1 is able to bring up a map display and the like by using the image data thus generated.

Various types of information such as a road map of an area around the subject vehicle position are provided to the user as screen display at the display monitor 16 based upon various types of information including the map data. The input device 17, equipped with input switches through which the user sets various commands may be a remote-control unit or the like. The user manually operates the input device 17 as prompted by instructions brought up on display at the display monitor 16 to select and set a destination.

As explained earlier, the touch panel 18 is a transparent panel disposed on the monitor screen at the display monitor 16, and the display on the display monitor 16 is viewed through the touch panel 18. In addition, as the display screen at the display monitor 16 is pressed or touched, the touch panel 18 is pressed down. As does the input device 17, the touch panel 18 has an input function. As a map screen, one of various buttons or a display menu at the display monitor 16 is pressed down with a finger, the touch panel 18 is pressed and the depressed position is calculated by the touch panel control unit 19. The depressed position thus calculated is then input to the control circuit 11 which uses the input information when setting a destination or executing a function corresponding to the depressed button or display menu.

In addition, as a road on display at the display monitor 16 is traced with a finger, the traced road is set as part of the route to the destination. Along the traced road, a locus line is displayed. The locus line is displayed by adopting a display mode different from the display mode for the other roads, e.g., by using a different display color or a different line width.

As the user sets a destination, the navigation system 1 executes an arithmetic operation based upon a specific algorithm to determine a route to the destination from a start point set at the current position detected by the GPS sensor 14c. The route thus determined (hereafter referred to as a "searched route") is indicated in the screen in a manner distinguishable from other roads by adopting a different display mode, e.g., by using a different display color or the like. As a result, the user is easily able to identify the searched route on the map in the screen. In addition, the navigation system 1 guides the vehicle along the searched route by providing visual instructions on the screen, audio instructions or the like to the user as the vehicle advances.

The VICS information reception unit 20 receives VICS information such as traffic jam information provided by a VICS information center (not shown) and outputs the received information to the control circuit 11. The VICS information is transmitted via radio beacons primarily installed on express highways, light beacons primarily installed on regular roads and FM multiplex broadcast stations. The VICS information having been transmitted via any of these means is received at the VICS information reception unit 20 of the navigation system 1.

The disk drive 21 reads out map data to be used to display a map at the display monitor 16 from the DVD ROM 22 loaded therein. It is to be noted that the map data may be read out from a recording medium other than the DVD ROM 22, such as a CD-ROM or a hard disk.

Figure 2:
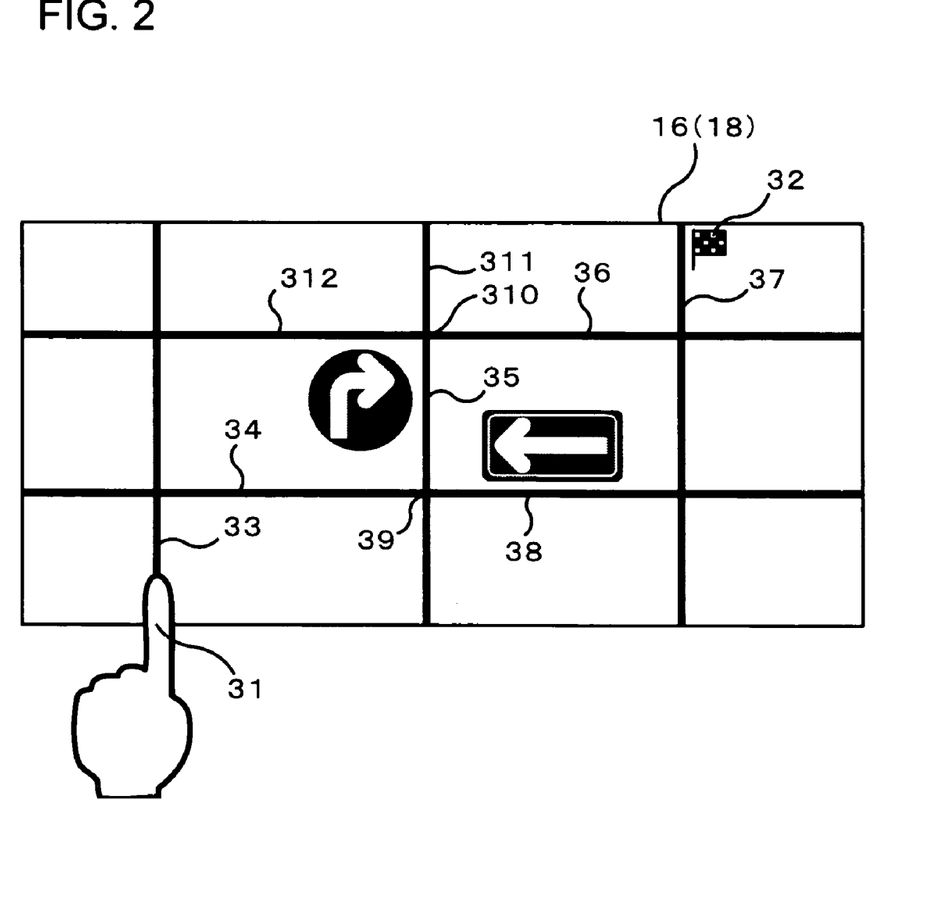
FIG. 2 shows a road map brought up on display at the display monitor.

Next, the operation performed to set a route to a destination by tracing roads displayed at the display monitor 16 with a finger is explained in reference to FIGS. 2 through 8B. FIG. 2 shows a display screen that may be up on display at the display monitor 16 when the user is about to trace a road on the display with his finger 31 in order to set a route to the destination. The route to the destination 32, which includes roads 33 through 37 the user wishes to travel on, is displayed at the display monitor 16. In addition, a road 38 is a one-way street and thus, it cannot be entered from an intersection 39. The traffic is also regulated at an intersection 310 in that vehicles traveling on the road 35 are only allowed to make a right turn and thus, they cannot enter roads 311 and 312 from the road 35.

Figure 3:
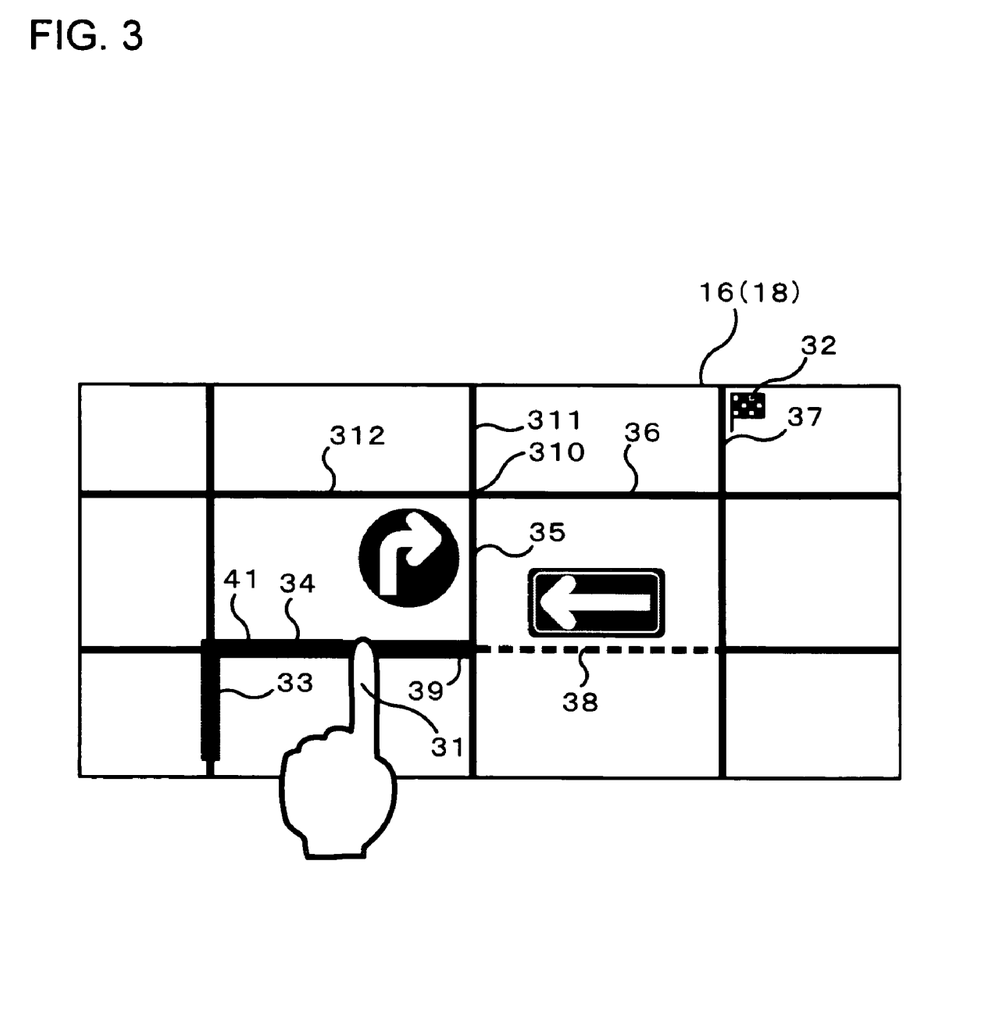
FIG. 3 illustrates the operation performed to set a route to a destination.
Figure 4:
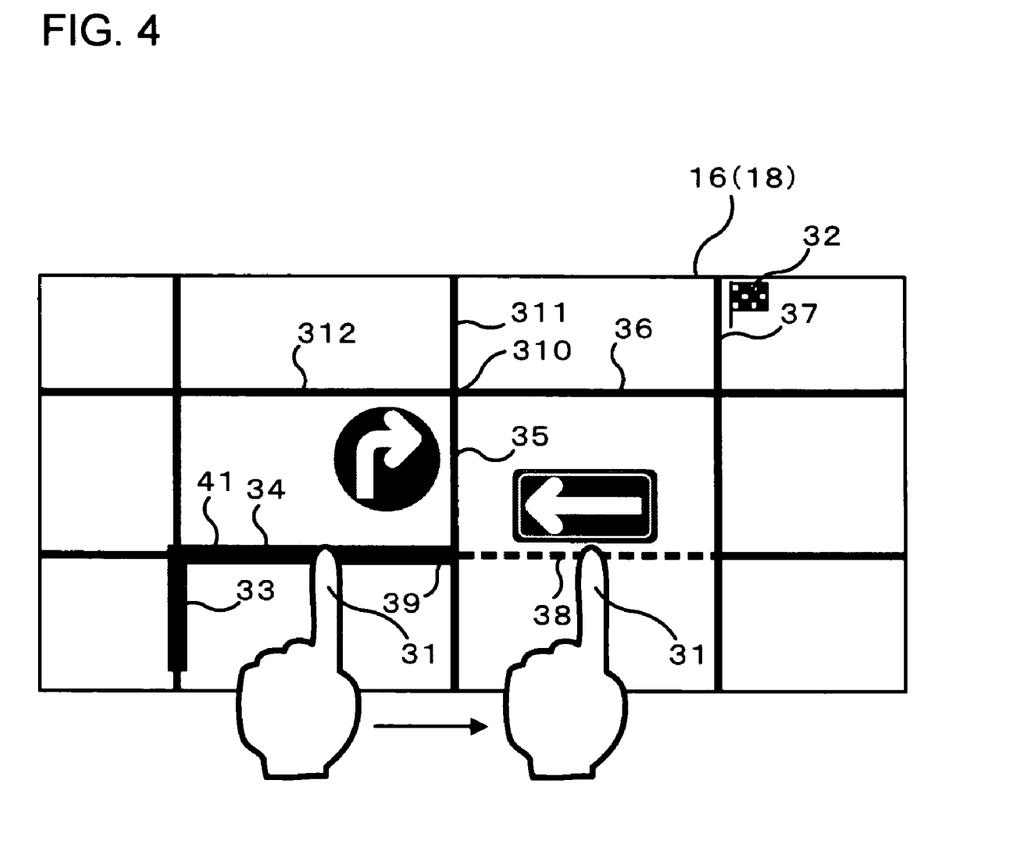
FIG. 4 shows a display screen that may be brought up at the display monitor when a road that cannot be entered due to traffic control has been traced with a finger.

FIG. 3 shows a screen display that may be brought up on the display monitor 16 when the finger tracing the roads has reached the road 34. The roads having been traced by the user are displayed as a locus line 41 indicating that the traced roads constitutes part of the route to the destination at the display monitor 16. As the finger 31 of the user tracing the roads reaches the road 34, the display of the road 38, which cannot be entered via the road 34, becomes lighter compared to the display of the other roads. For convenience, FIG. 3 indicates the lighter display as a dotted line. The lighter display is indicated in a similar manner in the subsequent figures as well. With the display of the road 38 lightened compared to the other roads, the user realizes that the road 38 cannot be entered. In addition, even if the no-entry road 38 is traced by mistake, the locus line 41 is not displayed along the road 38 and thus, the road 38 is not included as part of the route to the destination 32 being set, as shown in FIG. 4.

Figure 5:
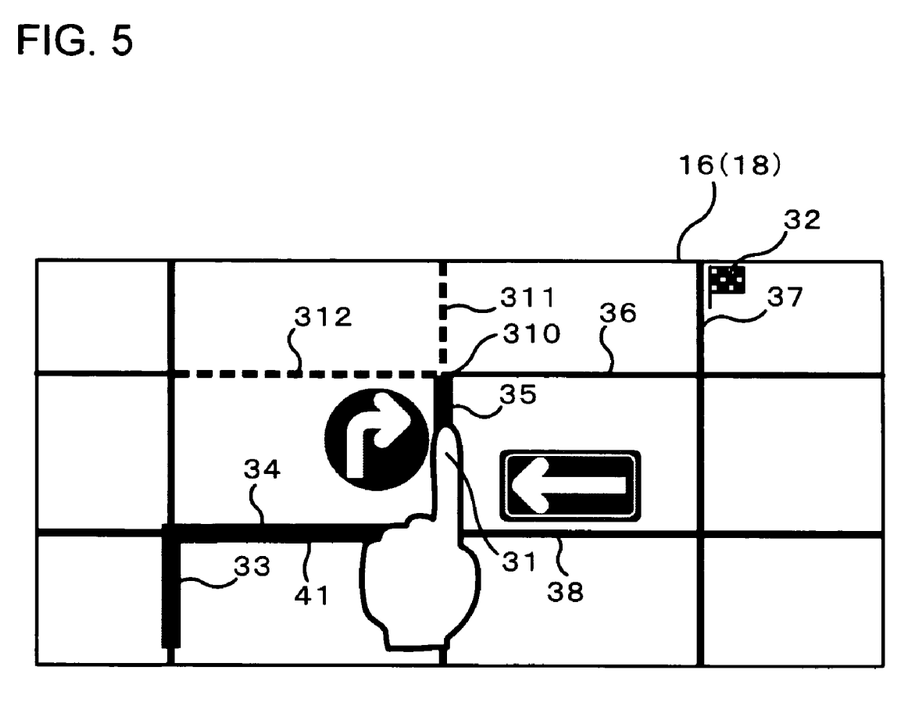
FIG. 5 illustrates the operation performed to set a route to a destination.
Figure 6:
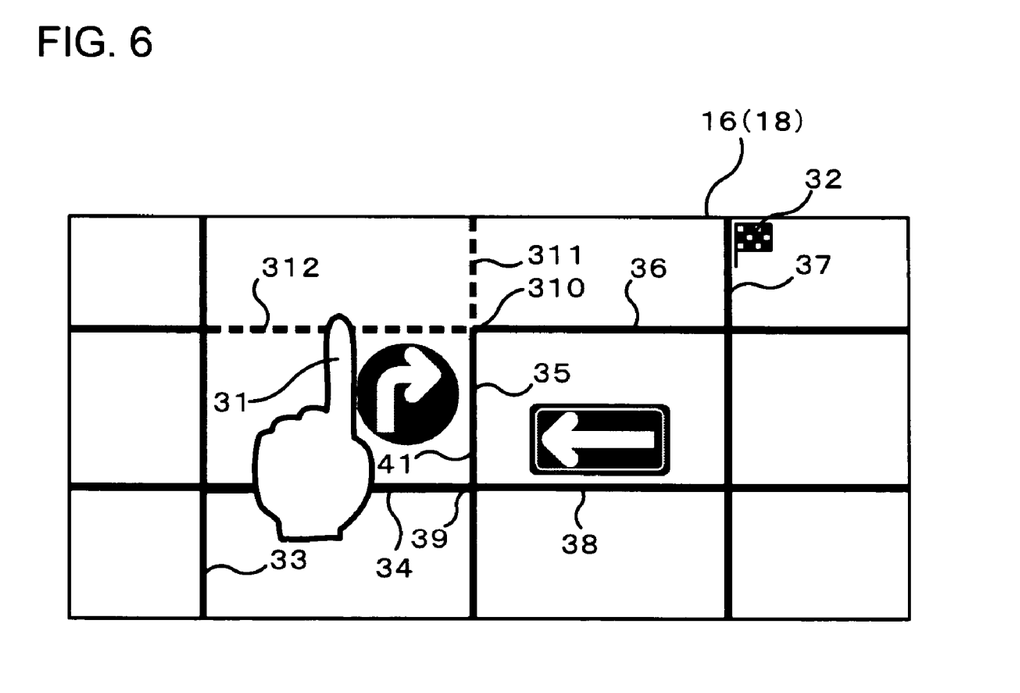
FIG. 6 shows a display screen that may be brought up at the display monitor when a road that cannot be entered due to traffic control has been traced with a finger.

FIG. 5 shows a screen display that may be brought up on the display monitor 16 when the finger tracing the roads has reached the road 35. As the finger 31 of the user tracing the roads reaches the road 35, the display of the roads 311 and 312, which cannot be entered via the road 35, becomes lighter compared to the display of the other roads. With the display of the roads 311 and 312 lightened compared to the other roads, the user realizes that the roads 311 and 312 cannot be entered. In addition, even if a no-entry road, e.g., the road 312 is traced by mistake, the locus line 41 is not displayed along the road 312 and thus, the road 312 is not included as part of the route to the destination being set, as shown in FIG. 6.

Figure 7:
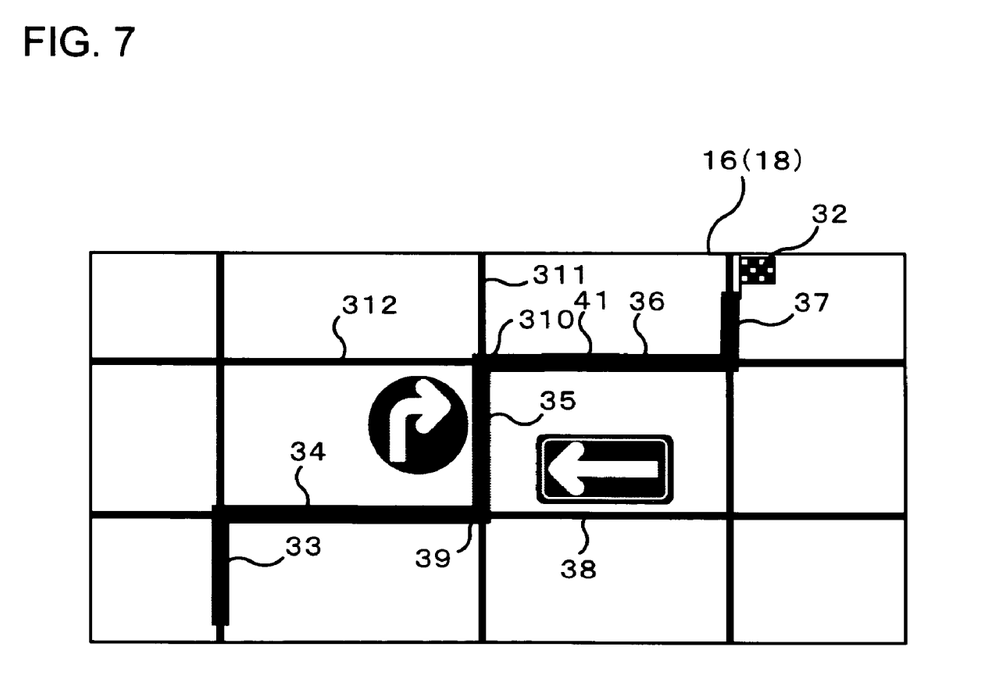
FIG. 7 shows a display screen that may be brought up on display at the play monitor when a route to the destination has been confirmed.

As all the roads 33 through 37 on which the user wishes to travel on the route to the destination 32 are traced with the finger 31, the roads 33 through 37 are indicated with the locus line 41, as shown in FIG. 7, and a plurality of links corresponding to the roads 33 through 37 are set as the route to the destination 32. Once the finger 31 is lifted off the display monitor 16, the-route setting for the route to the destination 32 along which the vehicle is to travel on the roads 33, 34, 35, 36 and 37 is confirmed. The information on the plurality of links corresponding to the roads having been traced with the finger 31 is then stored into the RAM 13 as route information on the route to the destination 32.

Figure 8A:
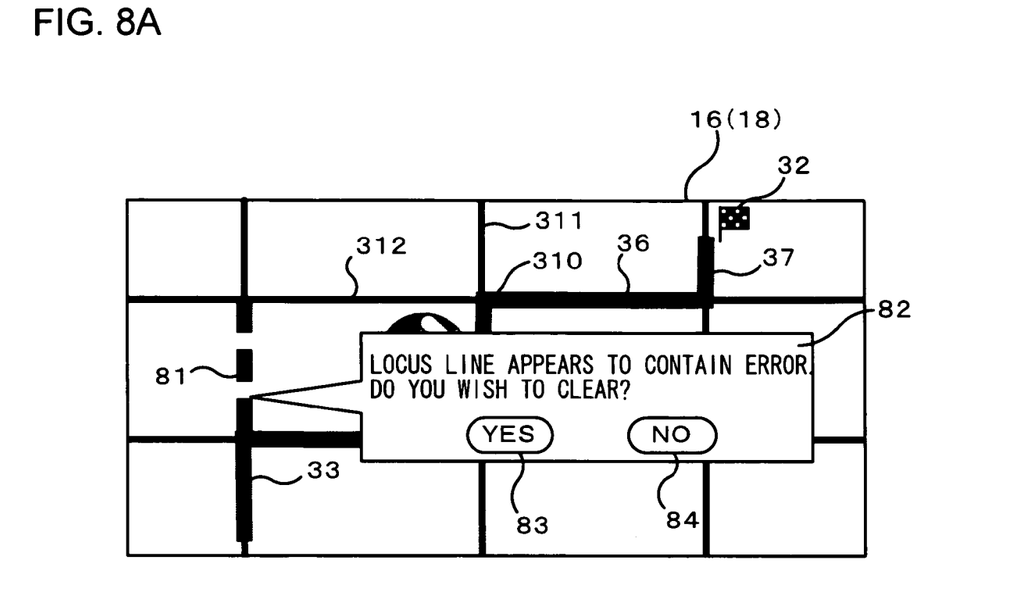
FIGS. 8A and 8B show display screens that may be brought up on display at the display monitor when a route that is not viable has been set.

Next, a decision is made as to whether or not the locus line 41 indicates erroneous tracing, i.e., whether or not the route to the destination 32 is an NG route: If there is a road that appears to have been erroneously traced, a query screen is brought up on display in which the user is asked whether or not he wishes to retry the route-setting operation. For instance, let us assume that the user erroneously draws a locus line 81 as well while drawing the locus-line 41 as shown in FIG. 8A. The navigation system 1 assumes a different display mode for the locus line 81 on the road that appears to have been traced erroneously and displays at the display monitor 16 an query message 82 asking whether or not the user wishes to clear the erroneously traced locus line.

Figure 8B:
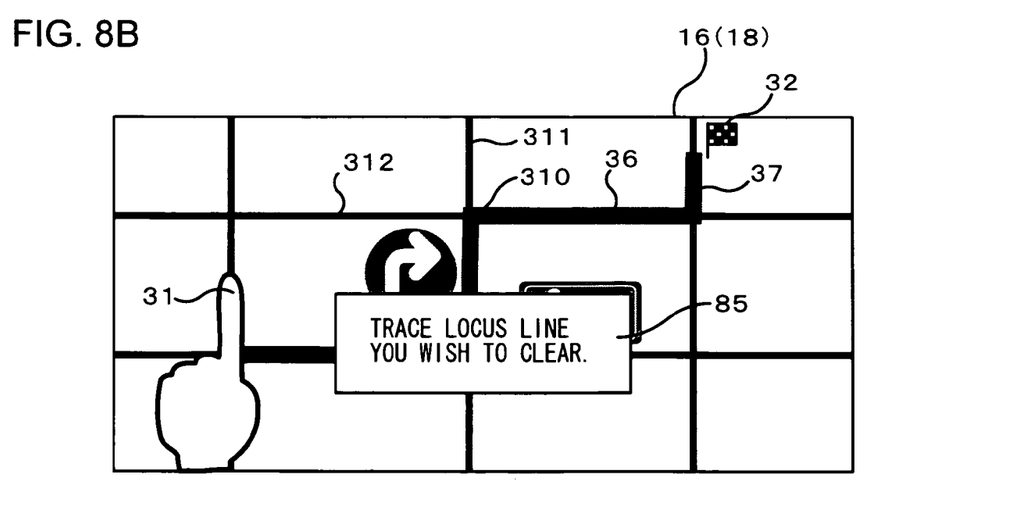

It is to be noted that the method adopted when judging whether or not a road has been erroneously traced is to be detailed later. Then, as the user presses down a YES button 83 and traces the locus line 81 with the finger 31, as shown in FIG. 8B, the locus line 81 is cleared. The information on the route to the destination 32, having been thus corrected, is then stored into the RAM 13. If the user presses down a NO button 84, the locus line 81 remains on display.

Figure 9:
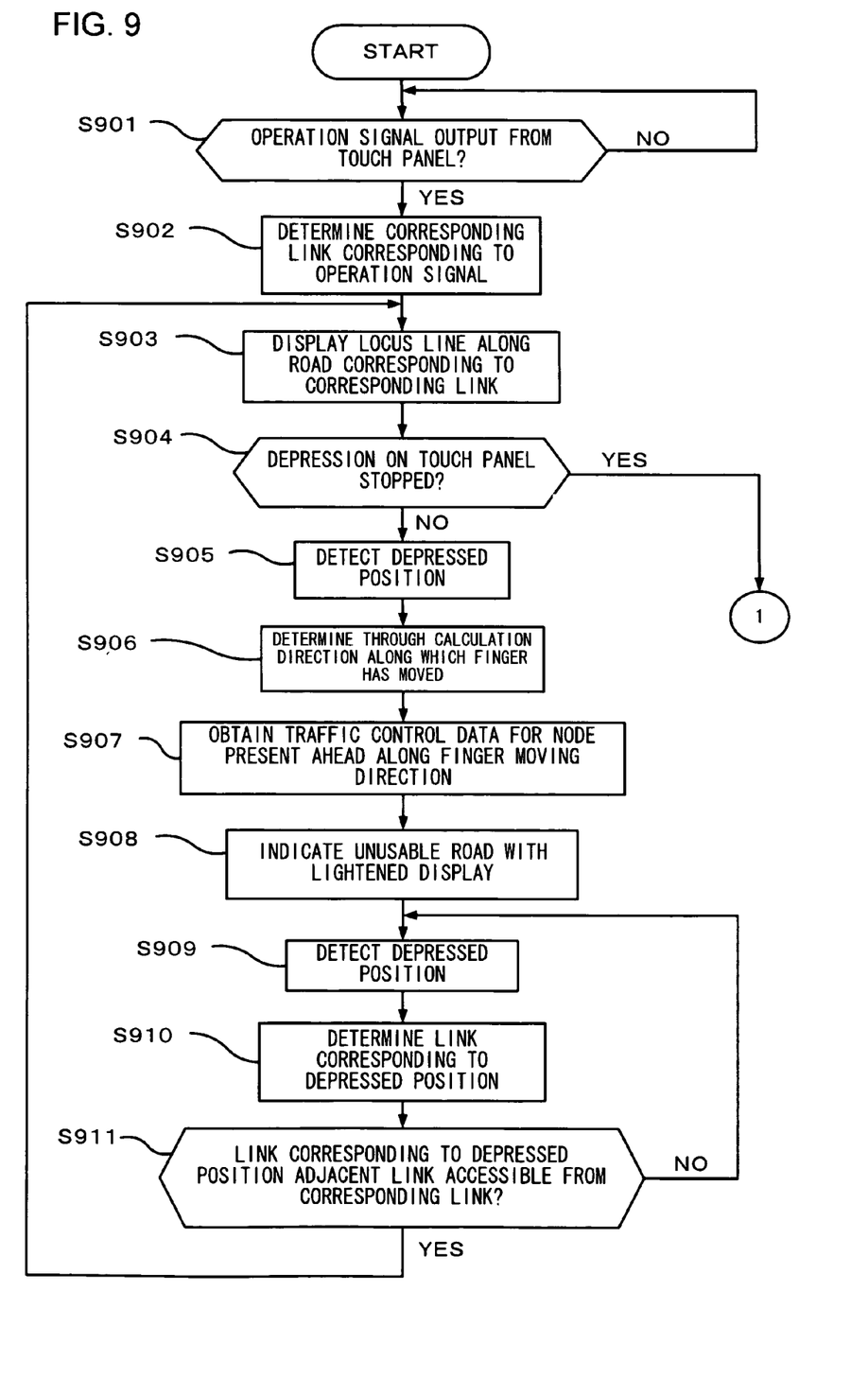
FIG. 9 presents a flowchart of part of the route setting processing executed in the navigation system 1.
Figure 10:
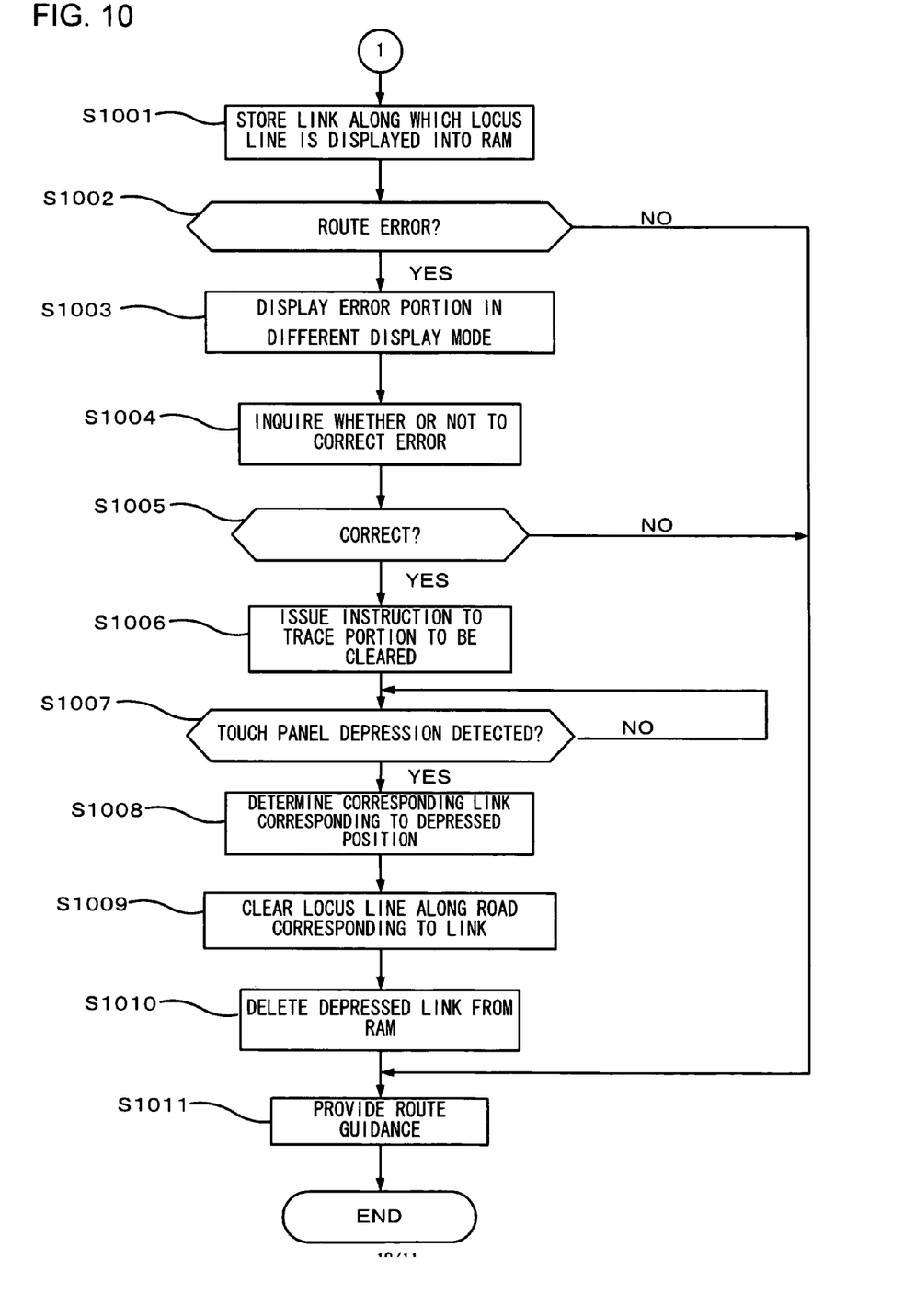
FIG. 10 presents a flowchart of part of the route setting processing executed in the navigation system 1.

Next, the route setting processing described above is explained in further detail in reference to the flowchart presented in FIGS. 9 and 10. The processing in FIGS. 9 and 10 is executed in the control circuit 11 based upon a program that is started up as a road map assuming a mode in which a route can be set by tracing roads with a finger is brought up on display at the display monitor 16.

In step S901, a decision is made as to whether or not an operation signal has been output from the touch panel 18 in response to a depression of the display screen at the display monitor 16, i.e., in response to a depression of the touch panel 18. If an affirmative decision is made in step S901, the operation proceeds to step S902, whereas the processing in step S901 is repeatedly executed if no operation signal is detected.

In step S902, a corresponding link corresponding to the operation signal output from the touch panel 18 is determined. The corresponding link is determined as follows. Namely, based upon the operation signal, the depressed position on the touch panel 18 is calculated and then the depressed position on the map is calculated as well. Next, nodes present within a predetermined range from the depressed position on the map are extracted from the map data stored in the DVD-ROM 22. The links connected to the extracted node are then extracted and the distance from each extracted link to the depressed position on the map is calculated. The link with the smallest distance among the distances thus calculated is selected as the corresponding link.

In step S903, the locus line 41 is displayed along the road corresponding to the corresponding link. In step S904, a decision is made as to whether or not the depression on the touch panel 18 has stopped. If the depression has not stopped, the operation signal is continuously detected and thus, a negative decision is made in step S904 to proceed to step S905. If, on the other hand, the depression on the touch panel 18 has stopped, the operation signal is no longer detected and accordingly, an affirmative decision is made in step S904 to proceed to step S1001.

In step S905, the depressed position on the map is detected again. In step S906, the direction along which the depressed position has moved, i.e., the direction along which the finger 31 has moved, is calculated based upon the current depressed position detected in step S905 and the previous depressed position having been detected in step S902.

In step S907, traffic control data for the node located ahead along the direction in which the finger 31 has moved, i.e., one of the two end nodes at the corresponding link, are obtained based upon the link information and the node information in the map data stored in the DVD-ROM 22. The node traffic control data are traffic control information related to links connected to the subject node and may indicate no entry from the corresponding link, e.g., one-way traffic, no right turn, no left turn or must turn. Traffic control information for individual links is stored as a control record in the map data. The link traffic control information can be extracted from link information for links (adjacent links) connected to the node located ahead along the direction in which the finger 31 has moved, i.e., one of the two end nodes at the corresponding link.

If traffic control is imposed at an adjacent link located along the direction in which the finger 31 has moved among the links connecting with the corresponding link and the road represented by the adjacent link cannot be entered from the corresponding link, the display mode for the road is altered so as to lighten the display of the road in step S908. If the road is accessible or can be entered from the corresponding link, however, the display mode is not altered.

In step S909, the depressed position at the touch panel 18 is detected. In step S910, the link corresponding to the depressed position is determined as in step S902. In step S911, a decision is made as to whether or not the link corresponding to the depressed position is an adjacent link accessible from the corresponding link. The decision as to whether or not the adjacent link can be entered from the corresponding link is made based upon the traffic control data for the node located ahead along the direction in which the finger 31 has moved, i.e., one of the two nodes at the corresponding link, which have been obtained in step S907.

If the link is an accessible link that can be entered, an affirmative decision is made in step S911 and the operation proceeds to step S903. If, on the other hand, the link is judged to be an unusable link that can not be entered, a negative decision is made in step S911 and the operation returns to step S909. Thus, if a road corresponding to an unusable link is pressed down, a negative decision is made in step S911 and the operation cannot proceed to step S903. As a result, no locus line 41 is displayed along the road corresponding to the link at the depressed position.

As explained earlier, if it is decided in step S904 that the finger is no longer touching the touch panel 18, the operation proceeds to step S1001 to store into the, RAM 13 a single link or a plurality of links corresponding to the road along which the locus line 41 is displayed as route information on the route to the destination 32.

In step S1002, a decision is made as to whether or not there is any route error in the route constituted with the links having been pressed down. The term "route error" in this context refers to, for instance, a route set by the user by moving his finger 31 back to the initial position after erroneously tracing a road, i.e., a route set by retracing the finger back-and-forth along the same road.

The decision as to whether or not there is a route error is made by judging whether or not the route having been set contains any branching portion, i.e., whether or not the route contains a node at which three or more links are connected. If a link among the three or more links connecting with the node does not connect with another link at the node on the other side, the link is judged to be a route error link. The decision as to whether or not another link is connected at the other node is made by judging whether or not the node information corresponding to the other node includes information on an adjacent node or information related to the link number (link ID) of a link connecting thereto.

An affirmative decision is made in step S1002 if the route having been set contains a route error, and the operation proceeds to step S1003 in this case. If, on the other hand, the route having been set contains no route error, a negative decision is made in step S1002 and the operation proceeds to step S1011. In step S1003, the error portion where the route error manifests is displayed in a display mode different from the display mode for the remaining route. For instance, the error portion may be displayed by using a different display color, by altering a display brightness level or by flashing the error portion.

In step S1004, an query is issued, asking the user whether or not he wishes to correct the error portion. This inquiry may be issued by, for instance, displaying a message 82 "The locus line appears to contain an error. Do you wish to clear?" at the display monitor 16, as shown in FIG. 8A. In step S1005, a decision is made as to whether or not the user wishes to correct the error. This decision may be made based upon the user's intent indicated via a YES button 83 or a NO button 84 displayed at the touch panel 18, as shown in FIG. 8A. If the YES button 83 is depressed, an affirmative decision is made in step S1005 to proceed to step S1006, whereas if the NO button 84 is depressed, a negative decision is made in step S1005 to proceed to step S1011.

In step S1006, a message 85 prompting the user to trace the route he wishes to clear with the finger 31 is displayed at the display monitor 16, as shown in FIG. 8B. In step S1007, a decision is made as to whether or not the touch panel 18 has been depressed. If an affirmative decision is made in step S1007, the operation proceeds to step S1008, whereas if a negative decision is made, the processing in step S1007 is repeatedly executed.

In step S1008, the link corresponding to the depressed position on the map is determined through a method similar to that having been explained in reference to step S902. In step S1009, the locus line 41 along the road corresponding to the link thus determined is cleared and in step S1010, the information on the determined link is deleted from the RAM 13 holding therein the route information on the route to the destination 32. In step S1011, route guidance, provided based upon the information on the route to the destination 32 stored in the RAM 13, starts. The route setting processing then ends.

It is to be noted that if an affirmative decision is made in step S1005, the operation may directly proceed to step S1009 without executing step S1006 through S1008, so as to immediately clear the part of the route indicated as the error portion.

The following advantages are achieved in the navigation system 1 in the embodiment described above.

(1) If a road having been traced with a finger on the display screen cannot be traveled due to traffic control, the road cannot be set as part of the route to the destination. Thus, a route containing roads not affected by traffic control is set as the route to the destination.

(2) When the route is set with the finger tracing roads on the display screen, a road corresponding to a link that cannot be entered by the vehicle, among the links connected with the node present ahead along the direction in which the finger has moved, is indicated as a lighter display compared to the other roads. As a result, the occurrence of an erroneous operation whereby a road that cannot be taken is traced with a finger by mistake is reduced. In addition, the route to the destination can be set by taking into consideration the inaccessibility of certain roads.

(3) Even if the user erroneously sets an unusable road as part of the route to the destination, the error in the route setting can be selectively corrected after the unusable road is judged to be a route error. In other words, the user does not need to reset the route to the destination from scratch. In particular, if the navigation system 1 is installed in a vehicle with a steering wheel set on the right-hand side, the risk of a right-handed driver erroneously tracing an unusable road as part of the route is high, since he will have to trace roads with his left hand. Thus, the navigation system 1 is particularly advantageous when installed in a vehicle with the steering wheel on the right-hand side.

The navigation system 1 achieved in the embodiment as described above may be modified as follows.

(1) While a road that cannot be entered (or accessed or used) due to traffic control is indicated as a lighter display compared to other roads, it may be indicated by adopting another display mode, as long as it is distinguishable from the other roads. For instance, the unusable road may be indicated by using a different display color or it may be made to flash in the display.

Figure 11:
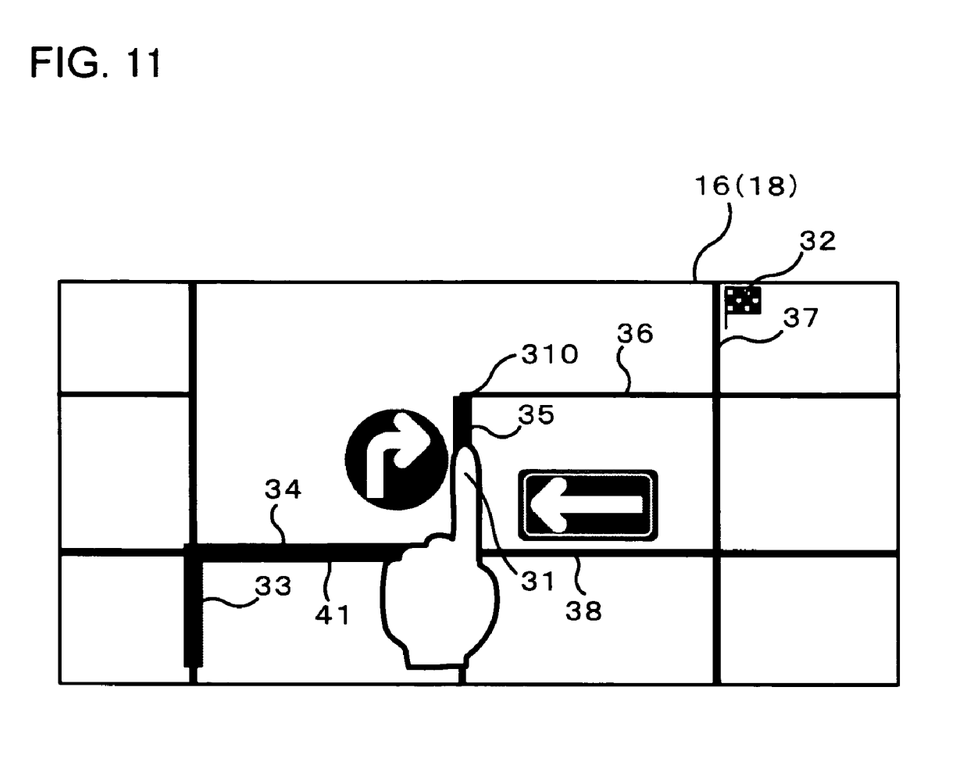
FIG. 11 shows a screen display that omits a road that cannot be taken due to traffic control.

(2) While a road that cannot be entered (or accessed or used) due to traffic control is indicated with a lighter display compared to the other roads, such an unusable road that cannot be entered due to traffic control may be excluded altogether from the display so as to ensure that it is not set as part of the route to the destination. FIG. 11, which corresponds to FIG. 5, shows an example of a display adopting this mode. The display in FIG. 11 does not include the roads 311 and 312 indicated as a light display in FIG. 5.

(3) Over a crowded area where numerous roads extend in close proximity to one another, a desired road may not be accurately traced with the finger. Accordingly, such a crowded area may be displayed in an enlargement at the display monitor 16. For instance, the node density or the link density in the map on display at the display monitor 16 may be calculated, and if the node density or the link density is equal to or higher than a predetermined level, the area may be judged to be too crowded to allow accurate tracing of the desired roads and the map may be displayed in an enlargement.

(4) While the portion of the route likely to manifest a route error is displayed by adopting a different display mode, the error portion may be indicated in an enlargement instead of in the different display mode.

(5) While the route to the destination is confirmed as the finger is lifted from the touch panel 18, an OK button may be displayed at the display monitor 16 instead so as to allow the user to confirm the route to the destination by pressing down on the OK button.

(6) When a wide area map is currently on display at the display monitor 16, a map area around the link corresponding to the depressed position may be enlarged to an extent that allows the user to accurately trace the desired roads.

(7) A link among three or more links connecting with a given node, which does not connect with another link at the node at the other end, is judged to be a route error link in the embodiment described above. However, a route error may manifest over a plurality of links. In such a case, a branching link with a smaller distance to the terminal point thereof may be judged to manifest a route error. In addition, a link connecting on the start point side may be unconditionally judged to be the correct link. Furthermore, if it is not possible to make a route error judgment, the three or more links connecting to the node may all be displayed in different display modes to allow the user to select the route portion to be cleared.

(8) While an explanation is given above in reference to the embodiment on an example in which the navigation system 1 is installed in a vehicle, the present invention is not limited to this example. The present invention may be adopted in a portable navigation system that can be carried around. In addition, it may be adopted in a portable telephone equipped with a navigation function. In either case, the portable navigation system or the portable telephone needs to include a touch panel screen, or roads may be traced by operating a cursor on display.

(9) In addition, the control program executed in the navigation system 1 described above may be installed in a personal computer to enable the personal computer to function as a navigation apparatus. In such a case, the control program for the navigation apparatus may be provided in a recording medium such as a DVD or a CD-ROM or through a data signal on the Internet or the like. Thus, the control program for achieving a navigation system with the features described above may be distributed as a computer-readable computer program product adopting any of various modes including a recording medium and a carrier wave. The personal computer to function as the navigation system must be equipped with a touch panel installed at the display screen thereof or roads may be traced by operating a cursor on display in this case as well.

The above described embodiment is an example and various modifications can be made without departing from the spirit and scope of the invention.

What is claimed is:

1. A navigation system comprising:
   a storage unit that stores map data managed with links representing smallest road units;
   a road map display unit that displays a road map based upon the map data;
   a depressed position detection unit that detects a depressed position on the road map on display; and
   a route setting unit that extracts a corresponding link corresponding to the depressed position and sets the extracted corresponding link as a route to a destination based upon the map data, wherein:
   the route setting unit extracts a link adjacent to the corresponding link and makes a decision as to whether or not the adjacent link can be entered from the corresponding link based upon the map data.

2. A navigation system according to claim 1, wherein:
if the adjacent link can be entered from the corresponding link and a subsequent depressed position corresponds to the adjacent link, the route setting unit sets the adjacent link as the route to the destination, and if the adjacent link cannot be entered from the corresponding link due to traffic control, the route setting unit does not set the adjacent link as the route to the destination even when the subsequent depressed position corresponds to the adjacent link.

3. A navigation system according to claim 1, wherein:
the road map display unit displays a road corresponding to the adjacent link in a display mode different from a display mode of other roads if the route setting unit judges that the adjacent link cannot be entered from the corresponding link due to traffic control.

4. A navigation system according to claim 2, wherein:
the road map display unit displays a road corresponding to the adjacent link in a display mode different from a display mode of other roads if the route setting unit judges that the adjacent link cannot be entered from the corresponding link due to traffic control.

5. A navigation system according to claim 1, wherein:
the road map display unit does not display a road corresponding to the adjacent link if the route setting unit judges that the adjacent link cannot be entered from the corresponding link due to traffic control.

6. A navigation system according to claim 2, wherein:
the road map display unit does not display a road corresponding to the adjacent link if the route setting unit judges that the adjacent link cannot be entered from the corresponding link due to traffic control.

7. A navigation system according to claim 1, wherein:
if three or more links are detected to be connected to one point in the route having been set, the route setting unit judges that a route error has occurred and issues a route error alert.

8. A navigation system according to claim 2, wherein:
if three or more links are detected to be connected to one point in the route having been set, the route setting unit judges that a route error has occurred and issues a route error alert.

9. A navigation system according to claim 1, wherein:
if three or more links are detected to be connected to one point in the route having been set, the route setting unit judges that a route error has occurred, extracts a link manifesting the route error among the three or more links and indicates the extracted link as a route error link.

10. A navigation system according to claim 2, wherein:
if three or more links are detected to be connected to one point in the route having been set, the route setting unit judges that a route error has occurred, extracts a link manifesting the route error among the three or more links and indicates the extracted link as a route error link.

11. A navigation system according to claim 7, wherein:
the route setting unit outputs a message asking whether or not to correct the route error and corrects the route having been set if a response indicating that the route error needs to be corrected is entered.

12. A navigation system according to claim 9, wherein:
the route setting unit outputs a message asking whether or not to correct the route error and corrects the route having been set if a response indicating that the route error needs to be corrected is entered.

13. A navigation system according to claim 7, wherein:
the route setting unit brings up a display that allows the link corresponding to the route error to be removed from the route having been set and removes the link corresponding to the route error from the route having been set in response to a cancel instruction.

14. A navigation system according to claim 9, wherein:
the route setting unit brings up a display that allows the link corresponding to the route error to be removed from the route having been set and removes the link corresponding to the route error from the route having been set in response to a cancel instruction.

* * * * *